US012062118B2

(12) United States Patent
Chen et al.

(10) Patent No.: US 12,062,118 B2
(45) Date of Patent: Aug. 13, 2024

(54) GENERATION SYSTEM AND GENERATION METHOD FOR PERSPECTIVE IMAGE

(71) Applicant: DELTA ELECTRONICS, INC., Taoyuan (TW)

(72) Inventors: Tien-He Chen, Taoyuan (TW); Che-Min Chen, Taoyuan (TW); Jia-Wei Yan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 506 days.

(21) Appl. No.: 17/499,360

(22) Filed: Oct. 12, 2021

(65) Prior Publication Data

US 2022/0114773 A1    Apr. 14, 2022

Related U.S. Application Data

(60) Provisional application No. 63/091,857, filed on Oct. 14, 2020.

(30) Foreign Application Priority Data

Jul. 2, 2021   (TW) .................................. 110124351

(51) Int. Cl.
*G06T 7/00*     (2017.01)
*G06T 11/00*    (2006.01)
*G06V 20/00*    (2022.01)

(52) U.S. Cl.
CPC .......... *G06T 11/005* (2013.01); *G06T 7/0002* (2013.01); *G06V 20/00* (2022.01);
(Continued)

(58) Field of Classification Search
CPC ................. G06T 11/005; G06T 7/0002; G06T 2207/10081; G06T 2207/10088;
(Continued)

(56) References Cited

U.S. PATENT DOCUMENTS

2008/0170660 A1    7/2008   Gudmundson et al.
2018/0211416 A1    7/2018   Chen et al.
(Continued)

FOREIGN PATENT DOCUMENTS

CN    111373448 A       7/2020
JP    2020096752 A  *   6/2020
(Continued)

OTHER PUBLICATIONS

Adrian Schwaninger: "Increasing Efficiency in Airport Security Screening", AVSEC World 2004, Nov. 3, 2004, XP055009005, Retrieved from the Internet: URL:https://irf.fhnw.ch/bitstream/handle/11654/3369/Schwaninger2004a. pdf?sequence=1 section 3.1, 3.2, 4; Figs. 6, 7.

(Continued)

*Primary Examiner* — Said M Elnoubi
(74) *Attorney, Agent, or Firm* — Chun-Ming Shih; HDLS IPR SERVICES

(57) ABSTRACT

A generation system and a generation method for a perspective image are disclosed. The present disclosure acquires a tomographic data set of a target object, determines a rotation information corresponding to a designated perspective of the target object, makes the perspective face a projection plane by rotating the tomographic data set or moving the projection plane based on the rotation information, and merges multiple slice images of the tomographic data set toward the projection plane to obtain a 2D image of the perspective of the target object. The present disclosure can effectively generate the 2D image of the designated perspective of the target object.

20 Claims, 11 Drawing Sheets

(52) U.S. Cl.
CPC .............. *G06T 2207/10081* (2013.01); *G06T 2207/10088* (2013.01); *G06T 2207/10104* (2013.01); *G06T 2207/10116* (2013.01); *G06T 2207/20081* (2013.01)

(58) Field of Classification Search
CPC . G06T 2207/10104; G06T 2207/10116; G06T 2207/20081; G06V 20/00; G06V 10/242; G06V 10/82
See application file for complete search history.

(56) References Cited

U.S. PATENT DOCUMENTS

| 2020/0279411 A1 | 9/2020 | Atria et al. |
| 2022/0164990 A1 | 5/2022 | Inoshita |

FOREIGN PATENT DOCUMENTS

| JP | 2020149086 A | 9/2020 |
| TW | 201827014 A | 8/2018 |
| WO | 2007131348 A1 | 11/2007 |
| WO | 2020195015 A1 | 10/2020 |

OTHER PUBLICATIONS

Tripathi Shashank et al: "Learning to Generate Synthetic Data via Compositing", arxiv.org, Jul. 8, 2019, pp. 1-19, XP055896887, Retrieved from the Internet: URL:https://arxiv.org/pdf/1904.05475.pdf [retrieved on Mar. 2, 2022] abstract; section 3; pp. 12-14; Fig. 1.

Wang Keze et al: "Dictionary Pair Classifier Driven Convolutional Neural Networks for Object Detection", 2016 IEEE Conference on Computer Vision and Pattern Recognition (CVPR), IEEE, Jun. 27, 2016, pp. 2138-2146, XP033021393, [retrieved on Dec. 9, 2016] section 4.1, 4.3; Fig. 1.

Song-Hai Zhang et al.: "What and Where: A Context-based Recommendation System for Object Insertion", arxiv.org, Nov. 24, 2018, XP081054052, Retrieved from the Internet: URL:https://arxiv.org/pdf/1811.09783.pdf section III.

Search Report dated Mar. 14, 2022 of the corresponding European patent application No. 21196786.4.

Office Action dated Sep. 6, 2022 of the corresponding Japan patent application No. 2021-155566.

Office Action dated Mar. 28, 2022 of the corresponding Taiwan patent application No. 110124351.

\* cited by examiner

GENERATION SYSTEM AND GENERATION METHOD FOR PERSPECTIVE IMAGE

CROSS-REFERENCE TO RELATED APPLICATION

This patent application claims the benefit of U.S. Provisional Patent Application No. 63/091,857, filed Oct. 14, 2020, which is incorporated by reference herein.

BACKGROUND

Technical Field

The technical field relates to images with respect to the perspectives, and more particularly related to a generation system and a generation method for a perspective image.

Description of Related Art

For training an artificial intelligence or professional inspectors (such as customs officers for contraband inspections) in object recognition, a large number of images (such as X-ray images) is needed as training images. The training images may be tomographic images obtained by scanning multiple objects from various perspectives, or virtual images generated by performing various deformations to the tomographic images. To obtain the tomographic images will consume a lot of time and manpower; to generate the virtual images may cause distortions.

Thus, the generation method for the training images of the related art has the above-mentioned problem, there is a need for a more effective solution.

SUMMARY

The present disclosed example is direct to a generation system and a generation method for a perspective image enabling to generate a lot of 2D images with respect to different perspectives of a target object without establishing a 3D perspective model.

In one of the embodiments, the generation method includes a) acquiring a tomographic data set generated by executing a tomographic scan on a target object, wherein the tomographic data set includes a plurality of slice images; b) determining a rotation information corresponding to a perspective of the target object; c) rotating the tomographic data set and a projection plane relatively based on the rotation information to make the tomographic data set with the perspective face the projection plane; and, d) executing a merging process on the tomographic data set toward the projection plane to obtain a 2D image of the perspective of the target object.

In one of the embodiments, the generation system includes a storage module, an output module, and a processing module electrically connected to the storage device and the output device. The storage module is used to store a tomographic data set generated by executing a tomographic scan on a target object, wherein the tomographic data set includes a plurality of slice images. The output module is used to output a 2D image of a perspective of the target object. The processing module is configured to determine a rotation information corresponding to the perspective of the target object, rotate the tomographic data set and a projection plane relatively based on the rotation information to make the tomographic data set with the perspective face the projection plane, and execute a merging process on the tomographic data toward the projection plane to obtain the 2D image of the perspective of the target object.

The present disclosure may effectively generate the 2D image of a designated perspective of the target object.

BRIEF DESCRIPTION OF THE DRAWINGS

The features of the present disclosure believed to be novel are set forth with particularity in the appended claims. The present disclosure itself, however, may be best understood by referencing to the following detailed description of the present disclosure which describes an exemplary embodiment of the present disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

A generation system and a generation method for a perspective image are disclosed by the present disclosure, the generation system and the generation method have the ability to, without consuming a lot of computing resources to build a 3D model, generate a lot of 2D images with respect to different perspectives (viewing surfaces) of a target object based on a plurality of slice images of a tomographic data set of the target object. Moreover, each of the above-mentioned 2D images of any perspective has a visual effect that is very similar to a perspective image obtained by performing a radiography to the target object according to the perspective.

Please be noted that it is necessary to acquire the tomographic data set of the target object for generating the 2D image with respect to a designated perspective. More specifically, the tomographic data set includes multiple slice images (also known as tomographic images) of the target object, the slice images respectively correspond to multiple layers of the target object along the same axis. The present disclosure may generate multiple 2D images each corresponds to different viewing surfaces and has the perspective effect by merging the multiple slice images in different directions.

Thus, the 2D images of the viewing surfaces having the perspective effect cannot be generated by a general optical camera, such as an RGB camera or a 3D scanner without a perspective photography function.

Moreover, when the slice images are generated respectively based on the different axes, it is hard and almost impossible to generate the 2D images of an arbitrary viewing surface by merging the slice images into one because the slice images are in the different axes.

Figure 1:
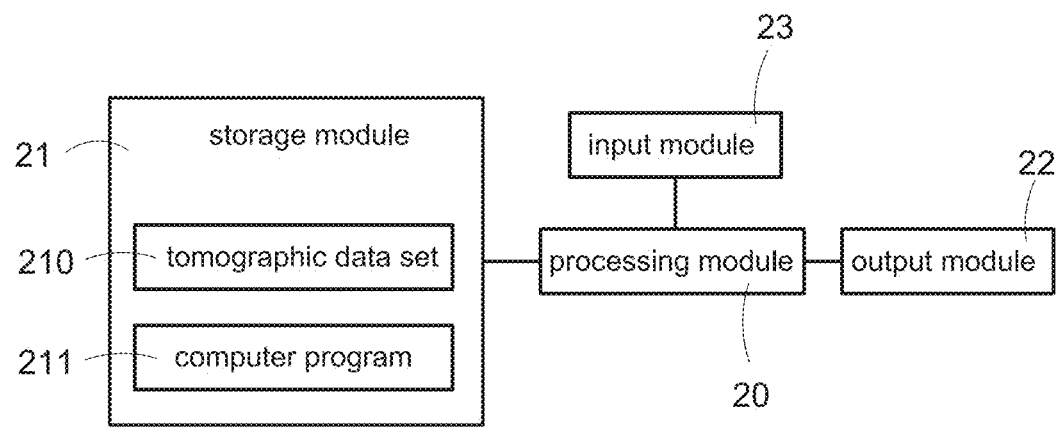
FIG. 1 is an architecture diagram of a generation system of one embodiment of the present disclosure.

Please refer to FIG. 1, the generation system 2 of the present disclosure may include a storage module 21, an output module 22, an input module 23 and a processing module 20 electrically connected to the above modules 21-23.

Figure 2:
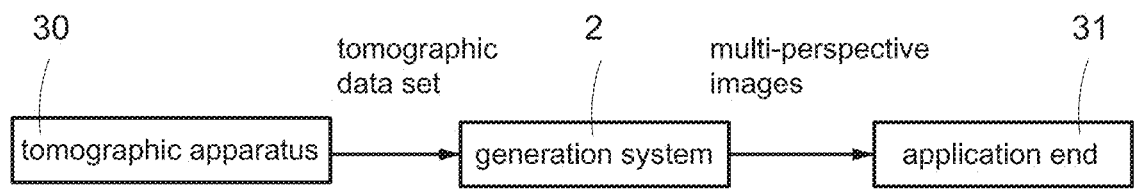
FIG. 2 is an applicational schematic view of a generation system of one embodiment of the present disclosure.

The storage module 21, such as a RAM, an EEPROM, a solid-state disk, a magnetic hard disk, a flash memory, etc. or any combination thereof, is used to record data. In one of the embodiments, the storage module 21 may save a tomographic data set 210 of one or more target object(s). Each tomographic data set 210 is obtained by using a tomographic apparatus (such as a tomographic apparatus 30 as shown in FIG. 2), such as a Computed Tomography (CT) equipment, a Magnetic Resonance Imaging (MRI) equipment, a Positron Emission Tomography (PET) equipment or other tomographic imaging equipment to execute a tomographic scan on each target object in advance, and the tomographic data set 210 of each target object is saved in the storage module 21 for being used.

The output module 22 is used to output an information. In one of the embodiments, the output module 22 may include a display equipment, such as a display, a touch screen, or a projection module, and enable to display a data on a local-end, such as displaying the 2D images being generated or the tomographic data set 210 being imported.

The input module 23 is used to receive user's operations. In one of the embodiments, the input module 23 may include an input equipment, such as a mouse, a keyboard, various buttons, or a touchpad.

The processing module 20, such as a CPU, a GPU, a TPU, a MCU, etc. or any combination thereof, is used to control the generation system 2 and implement the functions provided by the present disclosure.

In one of the embodiments, the generation system 2 may include a network module (not shown in FIG.s) electrically connected to the processing module 20, the network module may be an Ethernet network interface card, a Wi-Fi network interface card, a Bluetooth network interface card, a cellular network module, etc., and enable to communicate with an external apparatus (such as a tomographic apparatus 30 and/or an application end 31 described in FIG. 2) through the network (such as a wireless network, a wired network, a cellular network, a local area network (LAN), the Internet, etc.).

Figure 5:
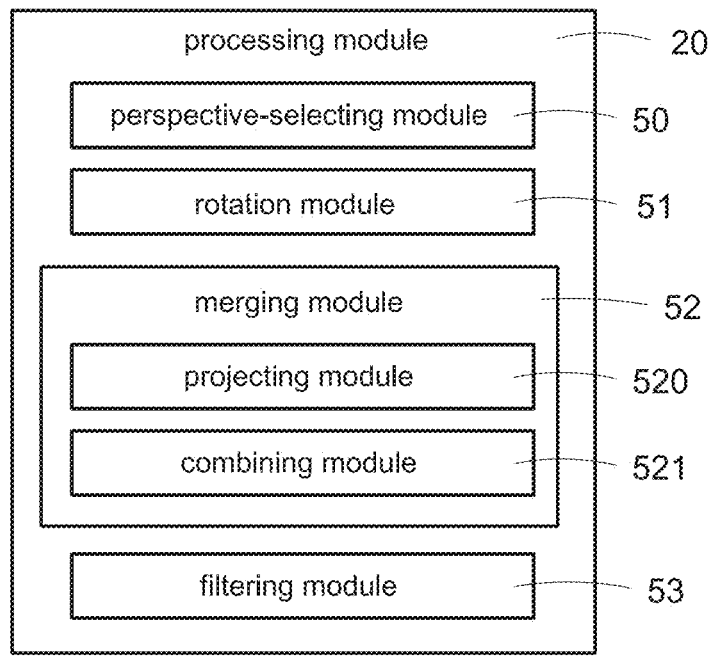
FIG. 5 is an architecture diagram of a processing module of one embodiment of the present disclosure.

Please refer to FIG. 1 and FIG. 5 simultaneously. In one of the embodiments, the processing module 20 may include modules 50-53 and modules 520-521. These modules 50-53, 520-521 are respectively configured to achieve different functions.

The above-mentioned modules 50-53, 520-521 are connected with each other (such as by an electrical connection or an information link), and each of the modules 50-53, 520-521 may be a hardware module (such as an electronic circuit module, an integrated circuit module, SoC, etc.), a software module (such as a firmware, an operating system, or an application program) or a combination of the hardware module and the software module, this specific example is not intended to limit the scope of the present disclosure.

Please be noted that when any of the above-mentioned modules 50-53, 520-521 is the software module, the storage module 21 may include a non-transitory computer-readable media (not shown in FIG.s). The non-transitory computer-readable media stores a computer program 211. The computer program 211 records a computer-readable code. When the processing module 20 executes the above computer-readable code, the functions of the corresponding module(s) may be achieved.

Next, a generation method of the present disclosure will be introduced. The generation method of each embodiment of the present disclosure may be applied to the generation system 2 of any of the embodiments shown in FIGS. 1-5.

Please refer to FIG. 1 to FIG. 6 simultaneously, the generation method of this embodiment includes following steps.

Step S10: the processing module 20 loads the tomographic data set 210 of a designated target object from the storage module 21. The loaded tomographic data set 210 is generated by executing a tomographic scan on the target object over a continuous range of angles simultaneously. The tomographic data set 210 includes a plurality of slice images (i.e., tomographic images) of the target object having the perspective effect. The slice images of the tomographic data set 210 may be arranged in sequence.

In one of the embodiments, the storage module 21 saves a plurality of tomographic data sets 210 respectively corresponding to different objects. A user may select one of the objects to be the target object through the input module 32 for loading the tomographic data set 210 of the object.

Step S11: the processing module 20 uses a perspective-selecting module 50 as shown in FIG. 5 to determine a rotation information corresponding to a designated perspective of the target object. For example, the designated perspective is a perspective that faces a default projection plane, and the perspective-selecting module 50 computes Euler angles or other types of rotation coordinates to be the rotation information that may make the perspective face the projection plane.

In one of the embodiments, the user may configure the perspective of a demanded 2D image through the input module 23, such as inputting a rotation angle of each axis.

In one of the embodiments, the storage module 21 may store a profile, the profile may record various parameters required to execute the generation method, such as the perspectives (or the corresponding rotation information) required to be fetched, an image resolution, an approach to compute a projection value, and/or a display range described later. The processing module 20 may load the profile to determine the rotation information corresponding to the designated perspective.

Step S12: the processing module 20 uses the rotation module 51 to execute a rotation process based on the determined rotation information so that the tomographic data set 210 and a default projection plane rotate relatively to make the tomographic data set 210 with the designated perspective face the projection plane.

In one of the embodiments, the present disclosure executes the rotation process to rotate the tomographic data set 210 and fix the projection plane. More specifically, the present disclosure may change or rotate the locations of all slice images of the tomographic data set 210 based on rotating angles of each axis indicated by the rotation information, so that the rotation of the tomographic data set 210 is achieved.

Figure 12:
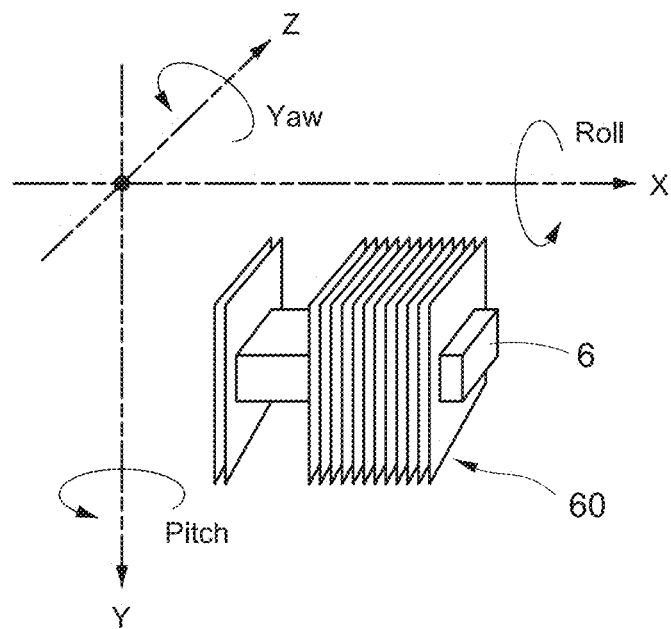
FIG. 12 is a schematic view of a tomographic data set of one embodiment of the present disclosure.

Please refer to FIG. 12, a tomographic data set 60 is generated by tomographic imaging on a target object 6. Multiple slice images of the tomographic data set 60 may be arranged continuously in space. The present disclosure may change the coordinates locations of all slice images to rotate the tomographic data set 60 (such as rolling along an X-axis, pitching along a Y-axis or yawing along a Z-axis) so that the tomographic data set 60 with the designated perspective may face a fixed projection plane.

In one of the embodiments, the present disclosure executes the rotation process to move or change the projection plane and fix the tomographic data set 60. More specifically, the present disclosure moves the projection plane to revolve around the tomographic data set 60 to a designated coordinates location corresponding to the perspective based on a rotating angle (or the coordinates location after rotation) indicated by the rotation information, so that the tomographic data set 60 with the perspective may face the designated projection plane.

Please refer back to FIG. 6, then the step S13 is performed: the processing module 20 uses the merging module 52 to execute a merging process on the tomographic data set 210 (60) toward the projection plane to combine the slice images of the tomographic data set 210 (60) into a 2D image with respect to the designated perspective.

Thus, the present disclosure may generate the 2D image with respect to the designated perspective with minimal computation and minimal complexity, and a 3D modeling that requires large computation and high complexity can be omitted. Because of the improvement of computation and complexity, the present disclosure can not only save the processing time, but also be suitable to medium-level and low-level hardware/software apparatuses, such as a CPU with a slower clock rate, a GPU with a slower computation speed, a hard-disk with a slower access speed. Also, no 3D modeling software is required, so that the building cost can be reduced.

Then, take rotating the tomographic data set for example to explain the rotating process and the projecting process of the present disclosure. Please refer to FIG. 14, a tomographic data set 91 before rotation is disclosed, threes angles (such as Euler angles) of the orientation of the tomographic data set 91 in a fixed coordinates system (such as a 3-dimensional Euclidean space) are marked as X3, Y3, Z3. A 2D image 81 with respect to a first perspective (such as the perspective shown in FIG. 16) may be obtained when projecting the tomographic data set 91 (such as performing the aforementioned merging process on the tomographic data set 91) toward a projection plane 80 from this perspective.

Figure 15:
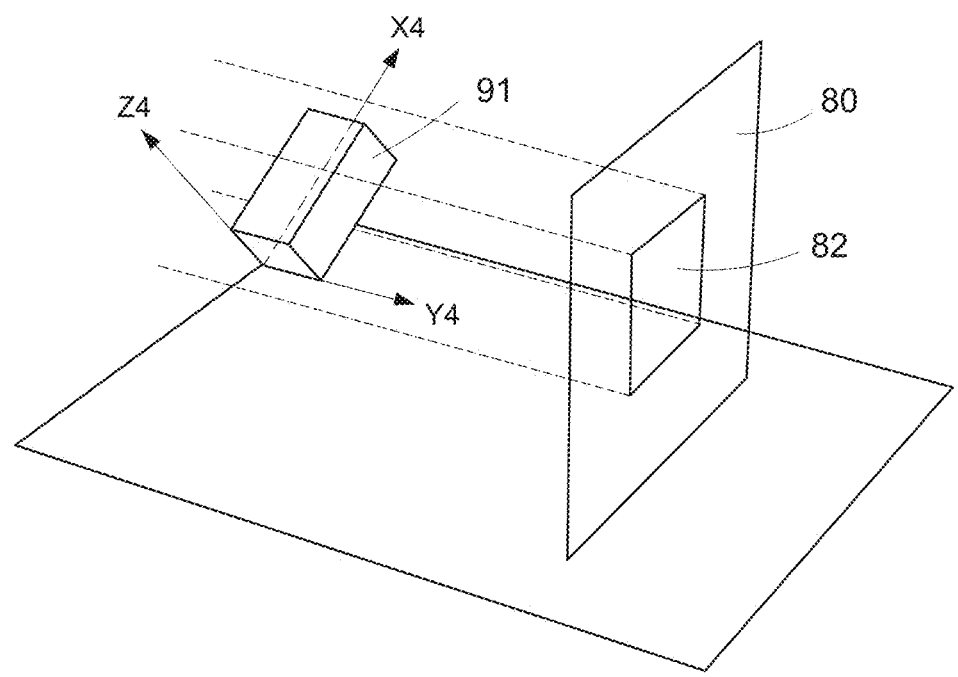
FIG. 15 is a schematic view of a projection after rotating a tomographic data set of one embodiment of the present disclosure.

Please refer to FIG. 15, the tomographic data set 91 after rotation is disclosed, the three angles of the orientation of the tomographic data set 91 in the fixed coordinates system are marked as X4, Y4, and Z4. Namely, the tomographic data set 91 faces the projection plane 80 with the different perspective after rotation. A 2D image 82 with respect to a second perspective (such as the perspective shown in FIG. 17) different from the first perspective may be obtained when projecting the rotated tomographic data set 91 (such as performing the aforementioned merging process on the tomographic data set 91) toward the projection plane 80 from the second perspective.

Figure 18:
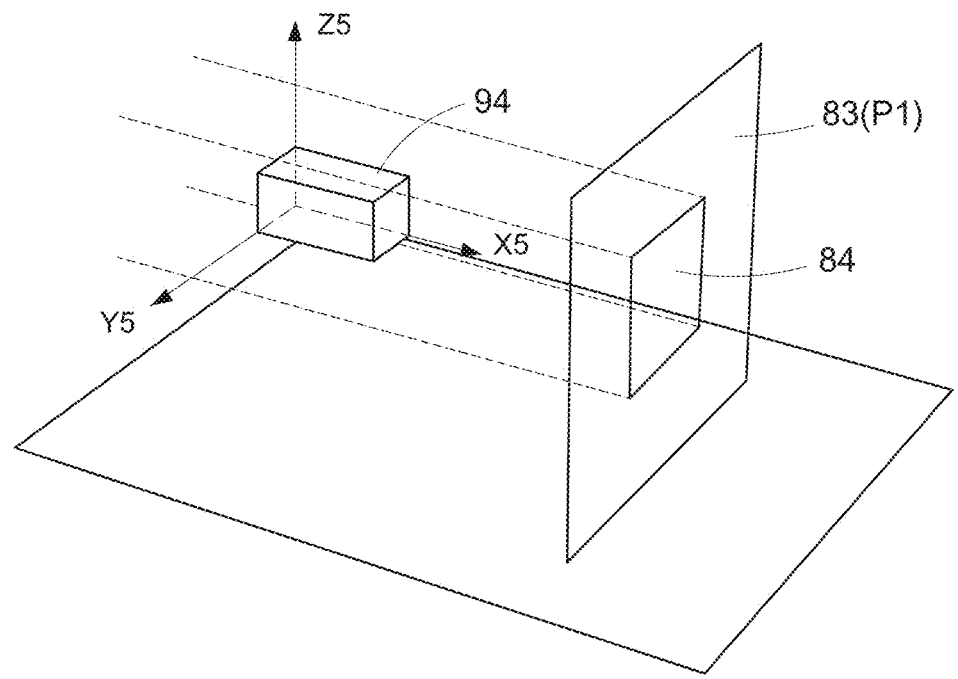
FIG. 18 is a schematic view of a projection of one embodiment of the present disclosure.

Then, take rotating the projection plane for example to explain the rotating process and the projecting process of the present disclosure. Please refer to FIG. 18, a tomographic data set 94 is disclosed. The three angles of the orientation of the tomographic data set 94 in the fixed coordinates system are marked as X5, Y5, and Z5, and a coordinates location of a projection plane 83 before rotation is indicated as P1. A 2D image 84 with respect to a first perspective (such as the perspective shown in FIG. 16) may be obtained when projecting the tomographic data set 94 (such as performing the aforementioned merging process on the tomographic data set 94) toward the projection plane 83 from the first perspective.

Figure 19:
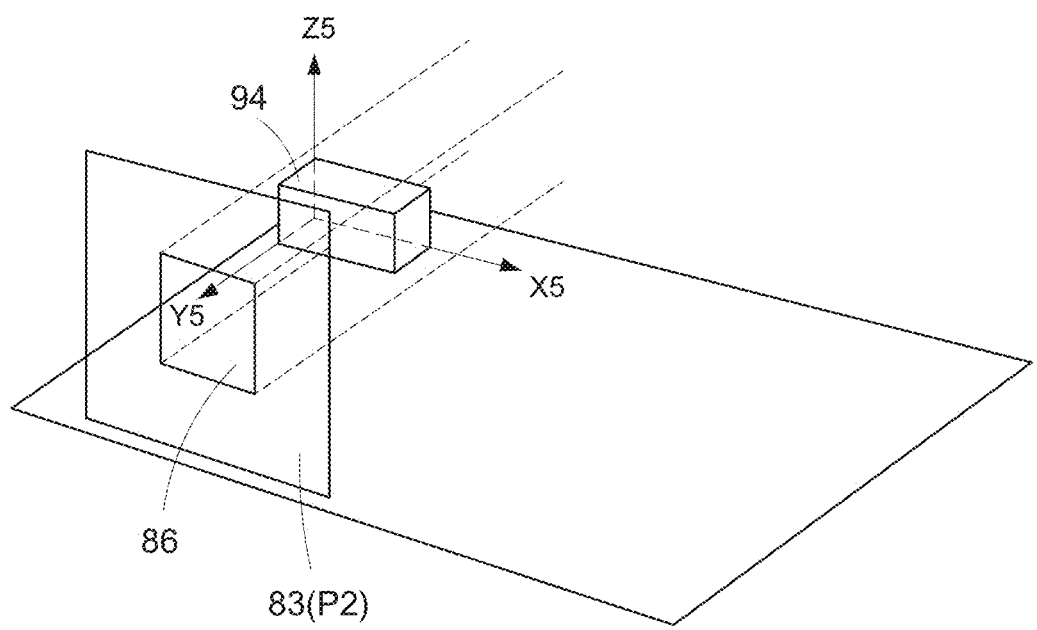
FIG. 19 is a schematic view of a projection after rotating a projection plane of one embodiment of the present disclosure.

Please refer to FIG. 19, after the rotating process (performed on the projection plane 83), the projection plane 83 is revolved around the tomographic data set 94 to a coordinates location P2 different from the P1. The tomographic data set 94 is not rotated in this case, the three angles of the orientation of the tomographic data set 94 in the fixed coordinates system remain as X5, Y5, Y5, but the coordinates location of the projection plane 83 is changed to P2, and the projection plane 83 faces the tomographic data set 94 with another perspective (such as a second perspective). A 2D image 86 with respect to the second perspective (such as the perspective shown in FIG. 17) may be obtained when projecting the tomographic data set 94 (such as performing the aforementioned merging process on the tomographic data set 94) toward the projection plane 83 from the second perspective.

Figure 16:
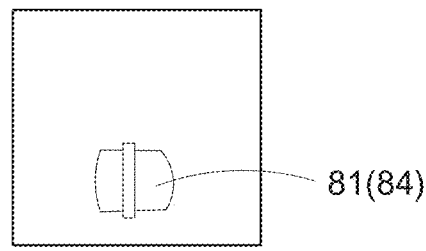
FIG. 16 is a schematic view of a 2D image obtained by a projection of one embodiment of the present disclosure.
Figure 17:
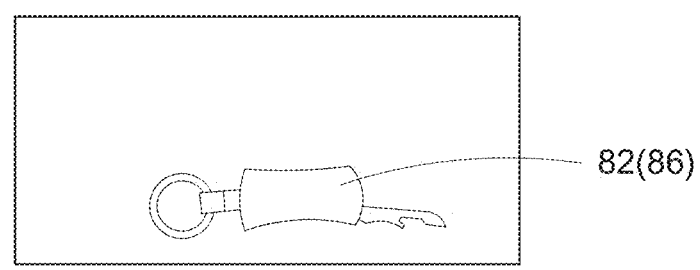
FIG. 17 is a schematic view of a 2D image obtained by a projection after a rotation of a perspective of one embodiment of the present disclosure.

Please be noted that the above 2D images 81, 84 (as shown in FIG. 16) with respect to the first perspective and the 2D images 82, 86 (as shown in FIG. 17) with respect to the second perspective may show the perspective effect because they are generated by the tomographic data. More specific, perspective 2D images of a target object (such as Swiss knife in FIGS. 16, 17) with respect to different perspectives may be generated in accordance with the tomographic data.

Figure 11:
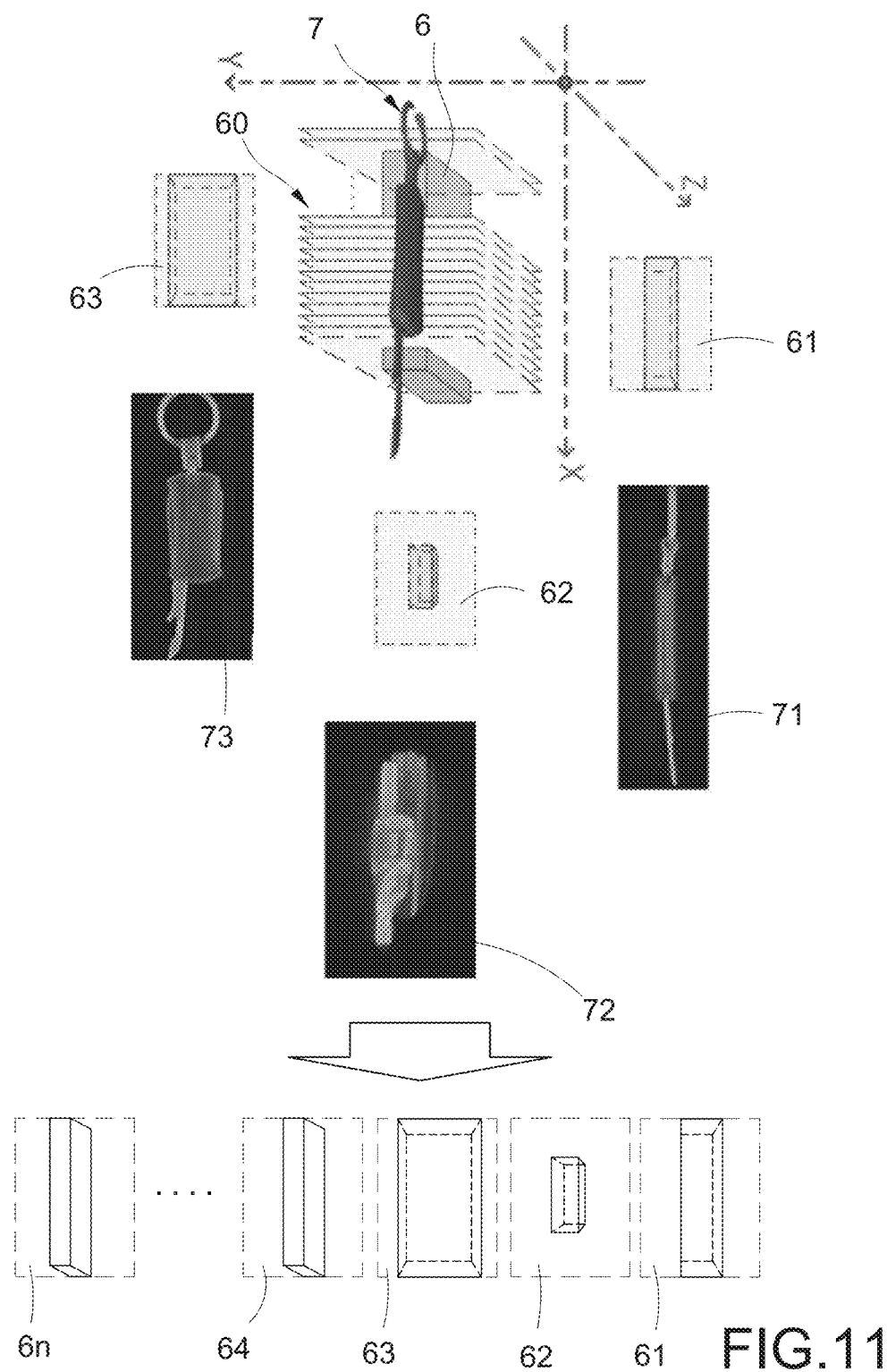
FIG. 11 is a schematic view of generating a 2D image of a perspective of one embodiment of the present disclosure.

Then, an example is taken to explain how the present disclosure generates multiple 2D images with respect to the multiple perspectives of the target object. Please refer to FIG. 11, a tomographic data 60 is generated by executing a tomographic scan on a target object 6. Multiple 2D images 61-6n each corresponds to one perspective may be generated by executing the merging process on the tomographic data 60 from different perspectives.

For example, a 2D image 61 with respect to a side perspective may be generated by executing the merging process on the tomographic data 60 from a side viewing angle, a 2D image 62 with respect to a front perspective may be generated by executing the merging process on the tomographic data 60 from a front viewing angle, a 2D image 63 with respect to an overlooking perspective may be generated by executing the merging process on the tomographic data 60 from an overlooking viewing angle, and so on.

In one of the embodiments, the tomographic data of a target object 7 (such as a Swiss knife, but it may be replaced with other objects to be inspected) is applied to the present disclosure multiple. In the embodiment, 2D images 71-73 of multiple perspectives of the Swiss knife having the perspective effect may be generated. When multi-perspective images (i.e., the multiple 2D images 71-73 of different perspectives) of the target object 7 are acquired, these multi-perspective images may be used to train a computer (such as a machine learning model 42 shown in FIG. 3 or FIG. 4) or human to learn to recognize the target object 7 from different perspectives, so as to improve the accuracy and speed of recognizing the target object 7.

Figure 7:
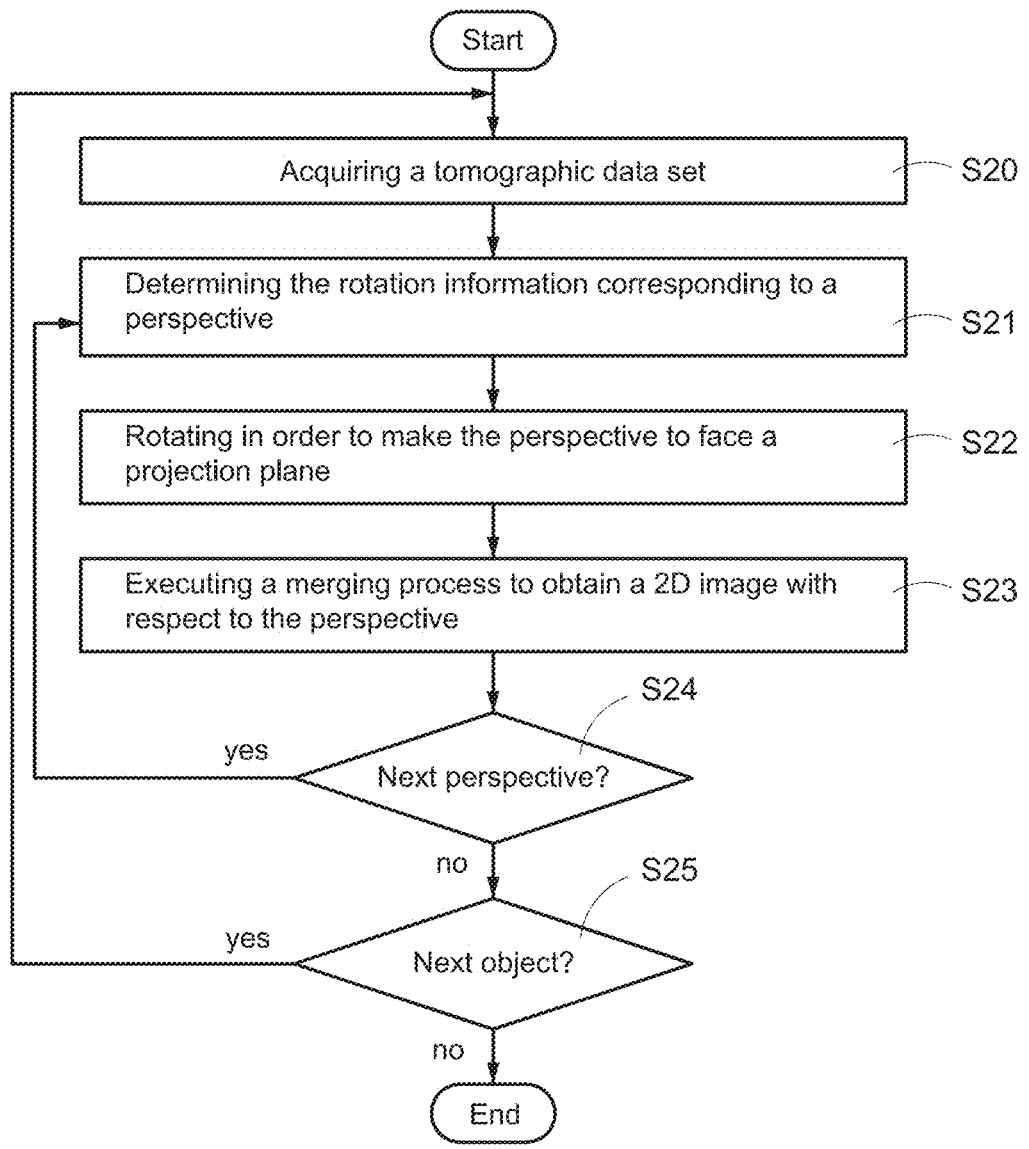
FIG. 7 is a flowchart of a generation method of one embodiment of the present disclosure.

Please refer to FIG. 7, the generation method of the present disclosure may be configured to generate the multi-perspective images of the same target object automatically (through step S24) and generate the multi-perspective images of different target objects automatically (through steps S24-S25). More specifically, the generation method of this embodiment includes following steps.

First, the generation method performs the step S20-S23 for the first time to generate a 2D image (referred to as a first 2D image) with respect to a designated perspective (such as a first perspective). The steps S20-S23 is the same as or similar to the steps S10-S13 of FIG. 6, the relevant description is omitted for brevity.

After the first 2D image is generated, a step S24 is performed: the processing module 20 uses the perspective-selecting module 50 to select another perspective (such as a second perspective) that is not yet merged from multiple pre-determined perspectives configured in advance. Then, the perspective-selecting module 50 performs the step S21-S23 again from the second perspective for obtaining another 2D image (referred to as a second 2D image) with respect to the second perspective, and so on, until the merging process is performed from all the predetermined perspectives and multiple 2D images with respect to all of the predetermined perspectives of the target object are obtained.

When the multi-perspective images of the target object (referred to as a first object) are obtained, the step S25 is performed: the processing module 20 determines whether to obtain the multi-perspective images of another object (such as a second object) if there are more than one object.

The generation method is finished when there is no other object to be processed.

When there is another object to be processed (such as the second object), the processing module 20 selects the second object as the target object, and then performs the steps S20-S24 for loading another tomographic data set of the second object and fetching the multi-perspective images of the second object one perspective by one perspective, and so on, until the multi-perspective images of all the objects are obtained.

Please be noted that the multi-perspective images of these objects may be used to train the computer (such as the machine learning model 42 described later) or human to learn to recognize the objects for improving the accuracy and speed of recognizing the objects. Particularly, the present disclosure may rotate and merge the slice images without building a 3D model for the tomographic data set. Thus, the steps of the 3D modeling, such as extracting point cloud data of the target object in each slice image of the tomographic data set, executing the 3D modeling to generating polygon meshes on the extracted point cloud data, and so on, may be omitted in the present disclosure, and the computational complexity of the present disclosure may be significantly reduced.

Figure 8:
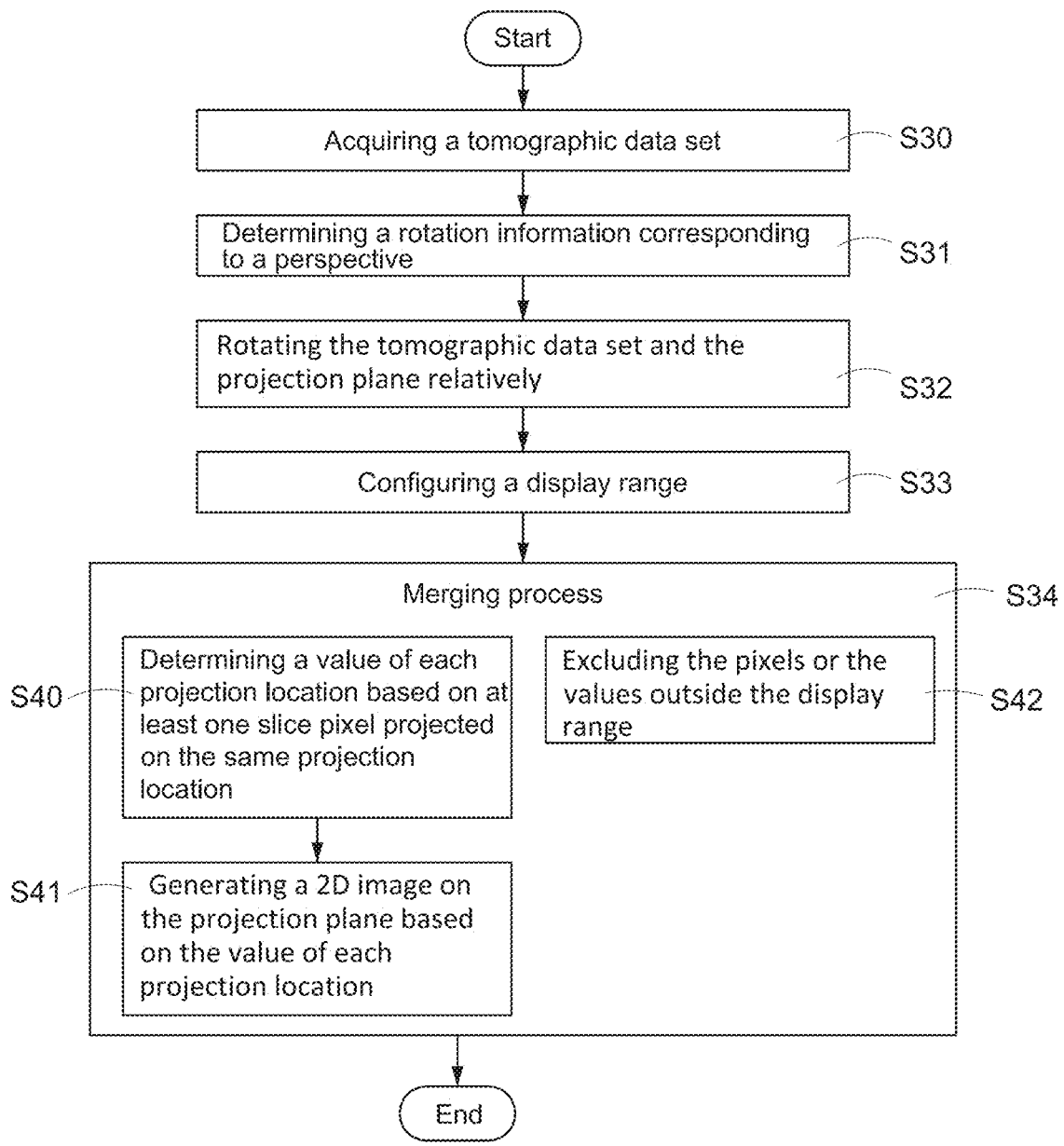
FIG. 8 is a flowchart of a generation method of one embodiment of the present disclosure.

Please refer to FIG. 8, the generation method of this embodiment may provide a filtering function (through step S33 and step S43) enabling to exclude uninteresting image portions. More specifically, the generation method of this embodiment includes following steps.

Figure 6:
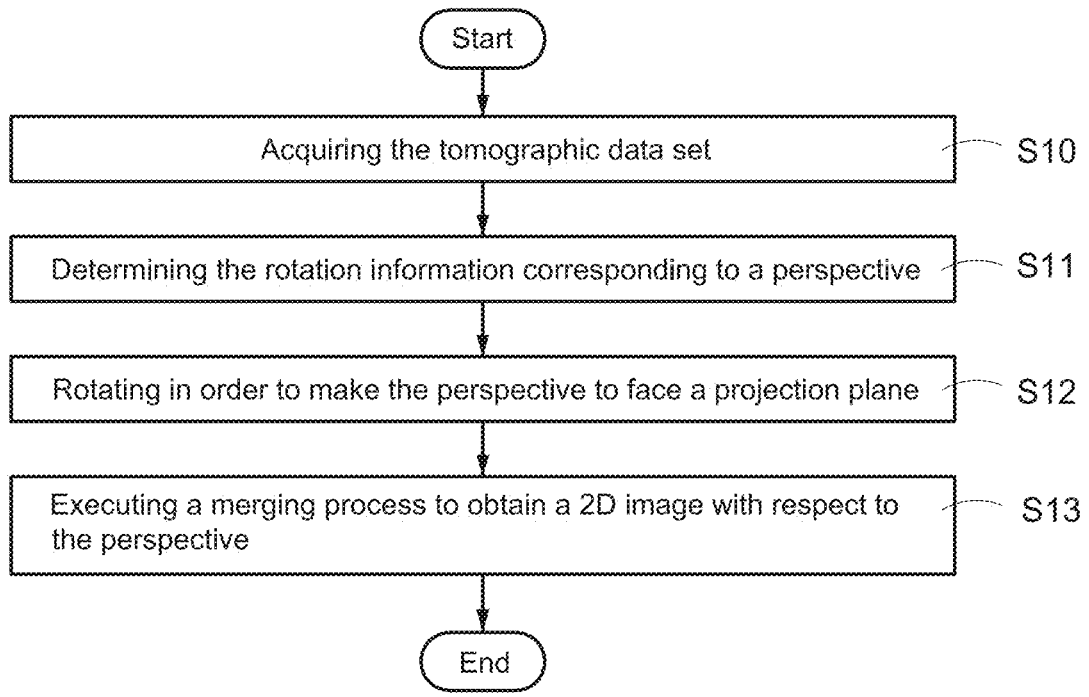
FIG. 6 is a flowchart of a generation method of one embodiment of the present disclosure.

Steps S30-S32 is the same as or similar to the steps S10-S12 of FIG. 6, the relevant description is omitted for brevity.

Step S33: the processing module 20 uses a filtering module (such as the filtering module 53 as shown in FIG. 5) to acquire a configured display range. The above display range may be configured by the user (through the input module 32) or the system automatically. For example, the display range may be different (interested) range of the Hounsfield Unit (HU) or gray-scale value being configured based on different physical properties (having different radiodensities, i.e., penetrability of a ray) of the target object.

For example, the display range may be configured as +1000HU to +2000HU, so that the image portions which the HU value outside this range will be filtered out as noises.

In one of the embodiments, take an 8 bits gray-scale image for example, the display range may be configured as a gray value between 100 to 200, so that the image portions which the gray value outside this range will be filtered out as noises.

Step S34: the processing module 20 uses the merging module 52 to execute the merging process to the rotated tomographic data set based on the configured display range.

In one of the embodiments, the merging module 52 may include a projecting module 520 and a combining module 521 as shown in FIG. 5. The step S34 may include steps S40-S42.

Step S40: the processing module 20 determines a value of each projection location of the projection plane based on one or more slice pixels of the slice images of the rotated tomographic data set being projected to the same projection location of the projection plane.

Figure 13:
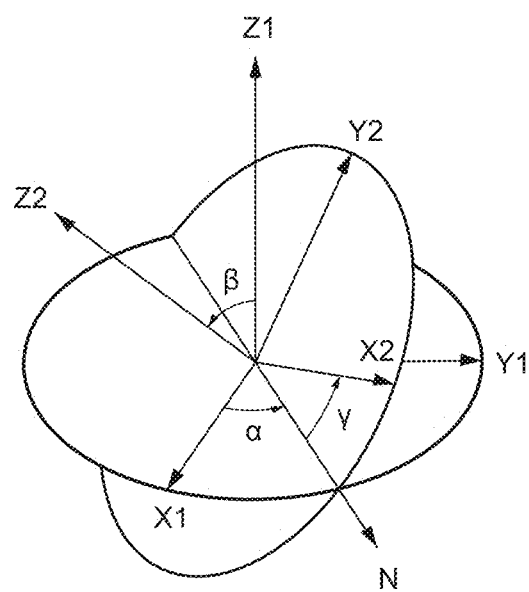
FIG. 13 is a schematic view of rotating a tomographic data set of one embodiment of the present disclosure.

In one of the embodiments, take rotating the tomographic data set for example, please refer to FIG. 13, the orientation of the tomographic data set before rotation are indicated as X1, Y1, and Z1. The orientation of the tomographic data set after rotation are indicated as X2, Y2, and Z2, and a normal line is indicated as N. The FIG. shows that the three Euler angles of the rotated tomographic data set is ($\alpha$, $\beta$, $\gamma$).

Besides, a corresponding rotation transformation matrix $M(\alpha, \beta, \gamma)$ is configured by the Euler angles. The above rotation transformation matrix $M(\alpha, \beta, \gamma)$ may be used to change the coordinates location of each slice image to simulate the rotation of the tomographic data set.

In one of the embodiments, the present disclosure may calculate the rotation transformation matrix $M(\alpha, \beta, \gamma)$ of the Euler angles ($\alpha$, $\beta$, $\gamma$) by following equations. Moreover, the coordinates location of the rotated slice image may be obtained by multiplying the coordinates location of each slice image by the rotation transformation matrix.

$$R_x(\theta_x) = \begin{bmatrix} 1 & 0 & 0 \\ 0 & \cos\theta_x & -\sin\theta_x \\ 0 & \sin\theta_x & \cos\theta_x \end{bmatrix} = \exp\left(\theta_x \begin{bmatrix} 0 & 0 & 0 \\ 0 & 0 & -1 \\ 0 & 1 & 0 \end{bmatrix}\right)$$

$$R_y(\theta_y) = \begin{bmatrix} \cos\theta_y & 0 & \sin\theta_y \\ 0 & 1 & 0 \\ -\sin\theta_y & 0 & \cos\theta_y \end{bmatrix} = \exp\left(\theta_y \begin{bmatrix} 0 & 0 & 1 \\ 0 & 0 & 0 \\ -1 & 1 & 0 \end{bmatrix}\right)$$

$$R_z(\theta_z) = \begin{bmatrix} \cos\theta_z & -\sin\theta_z & 0 \\ \sin\theta_z & \cos\theta_z & 0 \\ 0 & 0 & 1 \end{bmatrix} = \exp\left(\theta_z \begin{bmatrix} 0 & -1 & 0 \\ 1 & 0 & 0 \\ 0 & 0 & 0 \end{bmatrix}\right)$$

$$M(\alpha, \beta, \gamma) = \begin{bmatrix} \cos\gamma & -\sin\gamma & 0 \\ \sin\gamma & \cos\gamma & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} 1 & 0 & 0 \\ 0 & \cos\alpha & -\sin\alpha \\ 0 & \sin\alpha & \cos\alpha \end{bmatrix} =$$

$$\begin{bmatrix} \cos\gamma\cos\beta & -\sin\gamma & \cos\gamma\sin\beta \\ \sin\gamma\cos\beta & \cos\gamma & \sin\gamma\sin\beta \\ -\sin\beta & 0 & \cos\beta \end{bmatrix} \begin{bmatrix} 1 & 0 & 0 \\ 0 & \cos\alpha & -\sin\alpha \\ 0 & \sin\alpha & \cos\alpha \end{bmatrix} =$$

$$\begin{bmatrix} \cos\gamma\cos\beta & -\sin\gamma\cos\alpha + \cos\gamma\sin\beta\sin\alpha & \sin\gamma\sin\alpha + \cos\gamma\sin\beta\cos\alpha \\ \sin\gamma\cos\beta & \cos\gamma\cos\alpha + \sin\gamma\sin\beta\sin\alpha & -\cos\gamma\sin\alpha + \sin\gamma\sin\beta\cos\alpha \\ -\sin\beta & \cos\beta\cos\alpha & \cos\beta\cos\alpha \end{bmatrix}$$

Figure 14:
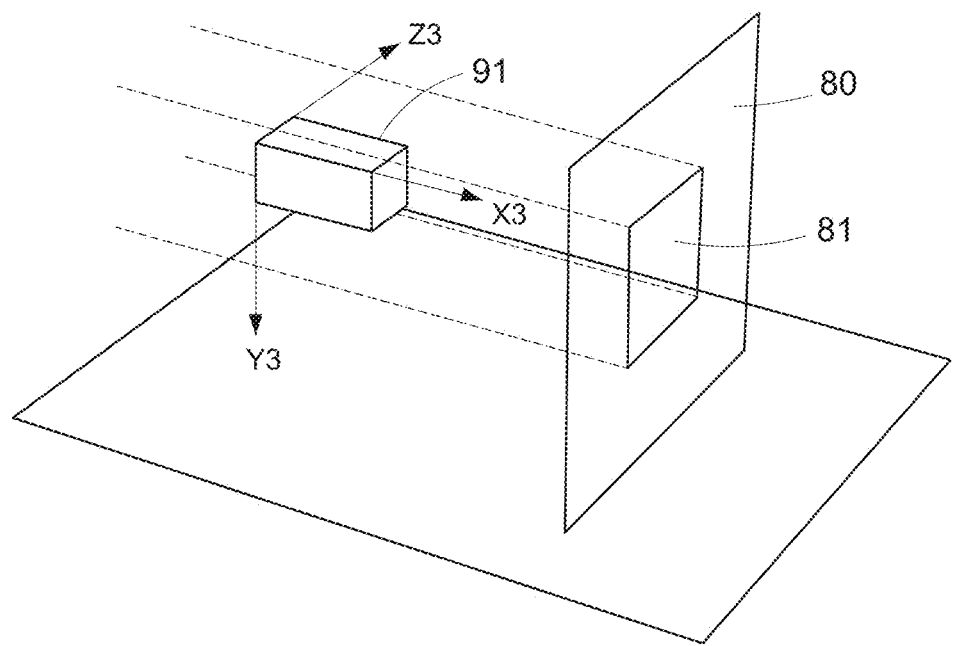
FIG. 14 is a schematic view of a projection of one embodiment of the present disclosure.

Please refer to FIG. 14 and FIG. 15, in one of the embodiments, the values of the projection locations (namely, each pixel value of the 2D image 82 with respect to the rotated perspective) may be calculated by following equations.

$$[x', y', w'] = [u, v, w] * \begin{bmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{bmatrix}$$

wherein [x', y', w'] is the value of the projection location (x', y', z') of the 2D image 82; [u, v, w] is the rotation coordinates (rotation information);

$$\begin{bmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{bmatrix}$$

is the pixel values of each slice image.

Please refer back to FIG. 8, then, the step S41 is performed: the processing module 20 uses the combining module 521 to generate the 2D image on the projection plane (as shown in FIGS. 14-17) based on the values of the multiple projection locations.

In one of the embodiments, when a plurality of slice pixels of multiple slice images is projected to the same projection location of the 2D image, the present disclosure may execute a union operation on these slice pixels, such as calculating a maximum, a minimum, or an average of the slice pixels as a final value of the projection location.

Please be noted that, in order to make the generated 2D image show the best perspective effect and be conducive to recognition training, the present disclosure configures the maximum, the minimum, or the average (may be selected based on the characteristics of the target object) of the slice pixels of the slice images being projected to the same projection location as the final value of the projection location.

Furthermore, If the final value of the projection location is calculated by accumulating the values of these slice pixels, there is a very high probability that the final value may exceed a maximum pixel value (take 256 colors grayscale for example, the maximum pixel value is 255), such that the perspective effect may disappear.

During the merging process, the step S42 may be performed: the processing module 20 performs at least one of the following steps to exclude the pixel values outside the configured display range for reducing the noise.

(1) During performing the step S40, to each slice image, to exclude the slice pixels outside the configured display range.

(2) During performing the step S41, to each slice image, to exclude the values of the projection locations outside the configured display range.

Thus, the present disclosure may effectively filter out the uninteresting images and the noises.

Please refer to FIG. 2, in one of the embodiments, the generation system 2 may be connected to a tomographic apparatus 30, and receive the tomographic data set generated by executing the tomographic scan on the target object from the tomographic apparatus 30.

In one of the embodiments, during the tomographic scan executed by the tomographic apparatus 30, the present disclosure may recognize the location and region of the target object among various objects in a container, and then execute a tomographic scanning at the location and within the region, so as to obtain the tomographic data set of the target object.

More specifically, a preliminary scanning is first executed to the container. For example, at least two 2D preliminary images of the container with respect to different scanning angles are generated by the preliminary scanning.

Then, the location and region of the target object may be recognized from the 2D preliminary images by the artificial intelligence models. A bounding box in the preliminary images may be shown and represented as the location and region of the target object.

Then, the tomographic apparatus 30 may start the tomographic scan toward the location and region to obtain a slice image sequence file (i.e., the tomographic data set) of the target object. The above slice image sequence file may be created by scanning the target object from a starting point (such as number zero) to an endpoint (such as number N) of the location. For example, the tomographic data set may include multiple slice images named C_0000.raw-C_NNNN.raw.

In one of the embodiments, the generation system 2 may be connected to the application end 31, such as a remote computer, a server, or a cloud service platform. The cloud service platform may be an Amazon Web Service, a Google Cloud Platform, a Microsoft Azure etc. and the generation system 2 may provide the generated multi-perspective images to the application end.

Figure 3:
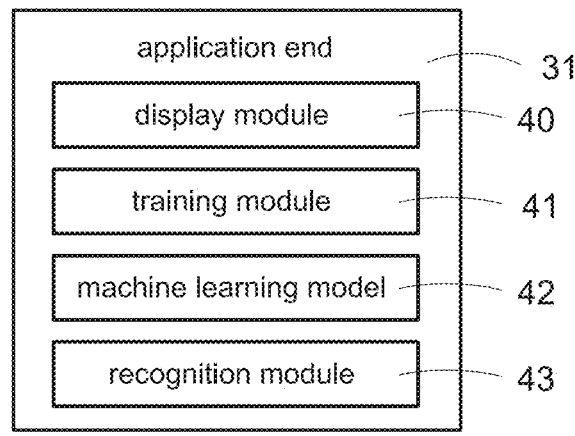
FIG. 3 is an architecture diagram of an application end of one embodiment of the present disclosure.

Please refer to FIG. 3, in one of the embodiments, the application end 31 may include a display module 40, such as a display, a touchscreen, a projection module, etc. The display module 40 is used to display the multi-perspectives 2D images acquired from the generation system 2.

In one of the embodiments, the application end 31 may include a training module 41, a machine learning model 42 and a recognition module 43. The training module 41 is configured to train the machine learning model 42 by using the multi-perspective images. The recognition module 43 is configured to execute the object recognition by using the machine learning model 42.

The training of the machine learning model 42 may be implemented by an algorithm, such as Convolutional Neural Network, Deep Learning, etc., but this specific example is not intended to limit the scope of the present disclosure.

The multi-perspective images generated by the present disclosure is used to establish and train the machine learning model 42 thus the accuracy and speed of the machine learning module 42 in recognizing the target object may be improved.

It's similar to the modules 50-53 and 520-521 shown in FIG. 5 that each of the training module 41, the machine learning model 42 and the recognition module 43 may be a software module, a hardware module, or a combination of the hardware module and the software module.

Figure 4:
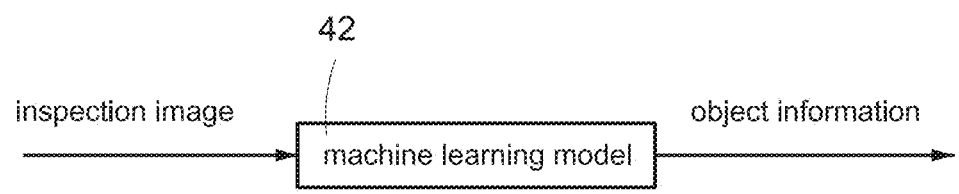
FIG. 4 is an applicational schematic view of a machine learning model of one embodiment of the present disclosure.

Please refer to FIG. 4, after the training of the machine learning model 42 is done, an inspection image (such as an X-ray luggage image generated by an X-ray scanner) may be inputted to the machine learning model 42, and the machine learning model 42 may automatically analyze the inspection image, and recognize and classify the object(s) in the inspection image. Therefore, an object information (such as object name or type, such as pistol, blade, etc.) of each object in the inspection image may be recognized.

Figure 9:
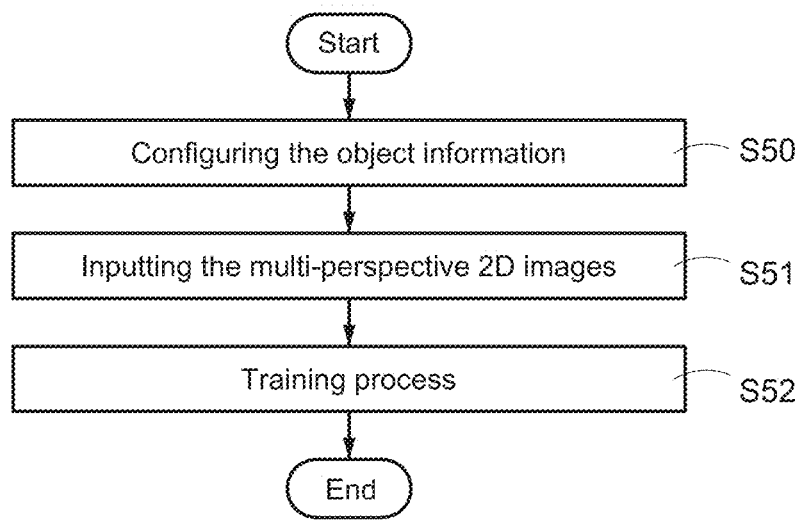
FIG. 9 is a flowchart of a training process of one embodiment of the present disclosure.

Please refer to FIG. 9. The following description discusses how the present disclosure uses the multi-perspective images to train the machine learning model 42. The generation method of this embodiment further includes following steps for implementing the training.

Step S50: the application end 31 uses the training module 41 to configure the object information of a set of multi-perspective images of a target object being used to train the training module 41 (namely, the multi-perspective images are multiple 2D images respectively corresponding to different viewing surfaces of the same target object). In other words, the object information of the target object is configured. The object information may include an object name, an object category, object characteristics, a security level, etc.

In one of the embodiments, the user may input the object information by using a human-machine interface (not shown in FIG.s) of the application end 31.

Step S51: the application end 31 uses the training module 41 to load the multi-perspective images of the target object generated by the generation system 2.

Step S52: the application end 31 uses the training module 41 to train the machine learning model 42 by the configured object information and the multi-perspective images for improving the accuracy and speed of the machine learning model 42 in recognizing the target object.

In one of the embodiments, the machine learning model 42 may capture image features from the 2D images with respect to multiple perspectives, so as to obtain the image features or classification rules of the target object in each perspective, and use the image features or the classification rules to recognize the target object.

In one of the embodiments, the machine learning model 42 may capable of recognizing multiple objects by being trained in accordance with multiple sets of the multi-perspective images of these objects, and the accuracy and speed of the machine learning model 42 in recognizing these objects may be improved.

Please be noted that, in comparison with the training implemented by a 3D model, the present disclosure significantly reduces the amount of data and time required for training/recognition via using the multi-perspective images in a 2D manner as a training material of the training.

Moreover, via using the 2D images as input of an artificial intelligence model (such as the machine learning model 42), the present disclosure may adjust training parameters flexibly, so as to prevent classifiers of the model from overfitting and then improve the recognition accuracy.

Figure 10:
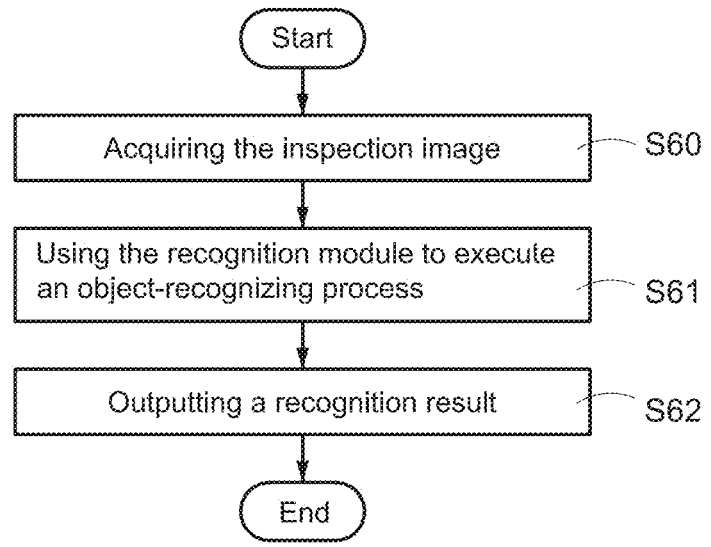
FIG. 10 is a flowchart of a recognizing process of one embodiment of the present disclosure.

Please refer to FIG. 10. The following description discusses how the present disclosure uses the trained machine learning model 42 to execute the object recognition. The generation method of this embodiment further includes following steps for the object recognition.

Step S60: the application end 31 controls the tomographic apparatus 30 to scan the object to be inspected to obtain 2D inspection images having the perspective effect of the object to be inspected. Take a baggage inspection procedure for an example, an X-ray inspection image may be obtained by using an X-ray tomographic machine to scan the baggage.

Step S61: the application end 31 uses the recognition module 43 to execute an object-recognizing process on the 2D inspection image through the machine learning model 42 to recognize the object information of each object from the 2D inspection image. For example, recognizing all of the objects in the baggage.

Step S62: the application end 31 uses the recognition module 43 to output a recognition result, such as outputting the object information of the recognized object, or outputting a warning when the recognized object includes a contraband object, but this specific example is not intended to limit the scope of the present disclosure.

Thus, the machine learning model 42 trained by the present disclosure has the excellent ability in recognition, thus the recognition may be executed very fast and accurate.

While this disclosure has been described by means of specific embodiments, numerous modifications and variations could be made thereto by those skilled in the art without departing from the scope and spirit of this disclosure set forth in the claims.

What is claimed is:

1. A generation method for a perspective image, the method comprising:
   a) acquiring a tomographic data set generated by executing a tomographic scan on a target object, wherein the tomographic data set includes a plurality of slice images;
   b) determining a rotation information corresponding to a perspective of the target object;
   c) rotating the tomographic data set and a projection plane relatively based on the rotation information to make the tomographic data set with the perspective face the projection plane; and
   d) executing a merging process on the tomographic data set toward the projection plane to obtain a 2D image of the perspective of the target object.

2. The generation method according to claim 1, further comprising:
   e1) selecting multiple perspectives of the target object; and
   e2) respectively performing the step b) to the step d) based on the multiple perspectives to obtain multiple 2D images of the perspectives of the target object.

3. The generation method according to claim 2, further comprising:
   f) training a machine learning model by an object information of the target object and the 2D images of the perspectives for recognizing the target object; and
   g) performing the step a) to the step d), the step e1) to the step e2 and the step f) by respectively configuring multiple objects as the target object.

4. The generation method according to claim 3, further comprising:
   h1) acquiring an inspection image; and
   h2) executing an object-recognizing process on the inspection image by using the machine learning model to acquire the object information.

5. The generation method according to claim 1, wherein the step b) further includes determining Euler angles corresponding to the perspective of the target object, and configuring a rotation transformation matrix based on the Euler angles.

6. The generation method according to claim 1, wherein the step c) further includes changing coordinates locations of the slice images based on the rotation information to rotate the tomographic data set while the projection plane is fixed.

7. The generation method according to claim 1, wherein the step c) further includes changing a coordinates location of the projection plane based on the rotation information while the tomographic data set is fixed.

8. The generation method according to claim 1, wherein the merging process includes:
   i1) determining a value of each projection location of the projection plane based on at least one slice pixel of the slice images being projected to the projection location; and
   i2) generating the 2D image on the projection plane based on the value of each projection location.

9. The generation method according to claim 8, wherein the step i1) further includes setting a maximum, a minimum, or an average of multiple slice pixels to be the value of each projection location when the multiple slice pixels are projected to the same projection location.

10. The generation method according to claim 8, further comprising a step j) before the step d), the step j) comprising:
    configuring a display range;
    wherein the merging process further includes:
    i3) excluding the at least one slice pixel outside the display range; or
    i4) excluding at least one of the values of the projection locations outside the display range.

11. A generation system for a perspective image, comprising:
    a storage module, used to store a tomographic data set generated by executing a tomographic scan on a target object, wherein the tomographic data set includes a plurality of slice images;
    an output module, used to output a 2D image of a perspective of the target object; and
    a processing module, electrically connected to the storage device and the output device, the processing module being configured to determine a rotation information corresponding to the perspective of the target object, rotate the tomographic data set and a projection plane relatively based on the rotation information to make the tomographic data set with the perspective face the projection plane, and execute a merging process on the tomographic data set toward the projection plane to obtain the 2D image of the perspective of the target object.

12. The generation system according to claim 11, wherein the processing module includes:
    a perspective-selecting module, configured to select multiple perspectives of the target object;
    a rotation module, configured to determine the rotation information corresponding to a selected one of the perspectives, and rotate the tomographic data set and the projection plane relatively based on the rotation information; and
    a merging module, configured to execute the merging process to generate the 2D images of the selected one of the perspectives.

13. The generation system according to claim 12, further comprising:
    a training module, configured to acquire an object information of the target object, and train a machine learning model by the object information and the 2D images of the perspectives for recognizing the target object;
    wherein the training module is configured to acquire multiple object information of multiple target objects and the 2D images of the perspectives of each of the target objects, and train the machine learning model by the object information and the corresponding 2D images of each of the target objects.

14. The generation system according to claim 11, further comprising:
    a tomographic apparatus, used to scan an object to be inspected to acquire an inspection image of the object to be inspected; and
    a recognition module, configured to execute an object-recognizing process on the inspection image by using the machine learning model to acquire an object information.

15. The generation system according to claim 11, wherein the processing module includes:
    a rotation module, configured to determine Euler angle corresponding to the perspective of the target object, and configure a rotation transformation matrix based on the Euler angles.

16. The generation system according to claim 11, wherein the processing module includes:
- a rotation module, configured to change coordinates locations of the slice images based on a rotation information to rotate the tomographic data set while the projection plane is fixed.

17. The generation system according to claim 11, wherein the processing module includes:
- a rotation module, configured to change a coordinates location of the projection plane based on the rotation information while the tomographic data set is fixed.

18. The generation system according to claim 11, wherein the processing module includes:
- a projecting module, configured to determine a value of each projection location based on at least one slice pixel of the slice images being projected to the projection location; and
- a combining module, configured to generate the 2D image on the projection plane based on the values of each projection location.

19. The generation system according to claim 18, wherein the projection module is configured to set a maximum, a minimum, or an average of multiple slice pixels to be the value of each projection location when the multiple slice pixels are projected to the same projection location.

20. The generation system according to claim 18, further comprising an input module electrically connected to the processing module, used to receive an operation of configuring a display range;
wherein the processing module includes:
- a filtering module, configured to exclude at least one of the slice pixels outside the display range, or
- exclude at least one of the values of the projection locations outside the display range.

* * * * *